United States Patent [19]

Namy

[11] 4,367,095

[45] Jan. 4, 1983

[54] PROCESS AND DEVICE FOR MANUFACTURING CEMENT CLINKER

[75] Inventor: Gérald Namy, Saint-Etienne, France

[73] Assignees: Creusot-Loire Entreprises, Suresnes; Lafarge S.A., Paris, both of France

[21] Appl. No.: 226,993

[22] Filed: Jan. 21, 1981

[30] Foreign Application Priority Data

Jan. 30, 1980 [FR] France .................................. 80 02001

[51] Int. Cl.³ .............................................. C04B 7/02
[52] U.S. Cl. ..................................... 106/100; 432/96; 432/97
[58] Field of Search .................... 106/100; 432/14, 15, 432/105, 106, 96, 97

[56] References Cited

U.S. PATENT DOCUMENTS

| | | | |
|---|---|---|---|
| 2,409,707 | 10/1946 | Roetheli | 106/100 |
| 3,584,848 | 6/1971 | Kiyonaga et al. | 106/100 |
| 4,213,790 | 7/1980 | Bauer et al. | 106/100 |

FOREIGN PATENT DOCUMENTS

| | | | |
|---|---|---|---|
| 29463 | 5/1970 | Australia | 106/100 |
| 1046617 | 10/1966 | United Kingdom | 106/106 |

*Primary Examiner*—James Poer
*Attorney, Agent, or Firm*—Pollock, Vande Sande & Priddy

[57] ABSTRACT

A process and apparatus for manufacturing cement clinker in which pellets of raw material containing the necessary components for manufacturing the clinker are introduced into an apparatus where the pellets flow under gravity, successively through a preheating zone, a clinkering zone using a fluidized bed and a cooling zone. The pellets contain an amount of comminuted carbon determined so that its combustion produces an amount of heat within each pellet sufficient to carry out decarbonation of the material, taking into account the heat introduced by the hot gases passing upwardly through the apparatus. Decarbonation is completed at the base of the preheating zone and the pellets enter the clinkering zone at a temperature which is close to the clinkering temperature. Additional heat is supplied through burners within the clinkering zone.

15 Claims, 2 Drawing Figures

PROCESS AND DEVICE FOR MANUFACTURING CEMENT CLINKER

BACKGROUND OF THE INVENTION

The invention relates to a process and a device for manufacturing cement clinker from raw material pellets containing the constituents necessary for manufacturing the clinker.

It is known that the clinker used in the composition of cement is obtained by calcining an intimate mixture of limestone and clay in a cement manufacturing kiln.

Apart from the traditional wet or dry processes in which the starting materials are intimately mixed to form a starting material in the form of a paste or a powder which is then fired, it has more recently been proposed to use as the starting material small balls or pellets consisting of agglomerated powders having homogeneous shapes and dimensions.

The conventional wet processes consume substantial quantities of energy, of the order of 1500 calories per kg of clinker.

Conventional dry processes which carry out the clinkering process in a rotary kiln consume considerably less energy, of the order of 850 calories per kg of the clinker. However, the theoretical lower limit of energy consumed for the production of the clinker is in the region of 430 calories per kg. It will thus be seen that the actual yield of cement manufacturing plants is only slightly greater than 50%.

Actual processes using the dry method use rotary kilns of very great length producing a clinker of extremely variable granulometry which leaves the kiln at a very high temperature.

A certain amount of the heat from the clinker leaving the rotary kiln is recovered by making use of coolers arranged at the outlet of such kilns. These coolers, do however, have a very poor yield as a result of the extremely variable granulometry of the clinker produced and of the difficulty of regulating, at all points, the air flow to the clinker to be cooled. Moreover, pre-heating of the raw materials is carried out before they enter the kiln, using recovery of the heat from the gases leaving the clinkering kiln. However, as the material entering the kiln is in the form of a powder, the heat exchange process is carried out using counter-flow in the pipes in which the hot gases carrying the material introduced along with them are circulating. It is consequently necessary to use a heat exchanger with several cyclone stages, each cyclone receiving the gases originating from the previous stage charged with the material recovered from the next stage and separating the material for re-introducing it into the feed pipe of the previous stage.

Consequently, although the powder is carried along in counter-flow by the gases, the use of several cyclone stages makes it possible to establish, right up to the point of entry into the rotary kiln, an overall circulation of the material in counter-flow to the gases, and in so doing, to partly improve the exchange of heat. However, this makes it necessary, in those installations producing large tonnages, to provide preheating towers of very considerable height, of the order of 50 m, and the temperature of the gas leaving the preheating plant is still very high, of the order of 300° C.

The overall thermal efficiency of cement manufacturing installations consequently remains at a relatively low level, despite progress which has been achieved by using the dry method in which use is made of techniques such as precalcining the solid matter before it is fed into the cement making kiln. In actual practice, the precalcining process which has the purpose of decarbonating the matter before it is introduced into the rotary kiln facilitates the job to be carried out by the latter, but does not substantially change the overall thermal yield of the process. It does, however, make it possible to use a shorter rotary kiln.

The introduction of solid products in powder form into the kiln, and the recovery at the outlet from the kiln of solid products of variable granulometry, complicates the thermal exchange carried out in the cooler and has the effect of producing pre-heating temperatures for the air which are relatively low. Additionally, it prevents use, in the plant of, the total amount of air pre-heated in this way.

Proposals have been made to carry out the shaping of the raw materials by forming them into pellets before they are introduced into the calcining plant which can take the form of a kiln with a vertical axis comparable to a tunnel kiln, where the products are able to circulate by gravity by forming a movable bed or in suspension in a gas. A heat exchanger operating on counter-flow principles has an excellent yield if care is taken to adjust accurately the flow rate of the materials and the fluids, taking into account their respective specific heats, and if such fluids are suitably distributed within the mass of the materials.

For this purpose, it is advantageous to divide the apparatus into three super-posed zones comprising an upper exchanger, a clinkering zone using a fluidized bed and a lower exchanger. Such a device is, for example, described in British Pat. No. 1,046,617.

The raw materials, in the form of pellets, are introduced into the upper portion of the device and circulate firstly in a pre-heating zone before being introduced into the central calcining zone where a burner makes it possible to raise the temperature of the product to the temperature needed for clinkering. The hot gases which are recovered from this zone are used for pre-heating the raw materials introduced into the installation, and the calcined materials leaving in calcining zone at high temperature pass to a cooling zone, where they come into contact with a flow of air which is circulating in the installation in counterflow with respect to the circulation of the solid matter.

In such a device, all the heat introduced is produced in the clinkering zone which makes use of reactions which include a large proportion of exothermic reactions. Moreover, although the solid matter has been pre-heated by using the hot gases from the clinkering zone, a considerable amount of heat energy must additionally be supplied in order to reach the clinkering temperature, which is in the region of 1450°. It is in fact necessary to obtain, within these zones, a supply of heat which is all the greater because decarbonation of the raw materials at a temperature of 900° requires more than 400 cal/kg of clinker (amounting to 90% of the energy total, within this zone). The pellets which form a fluidized bed in the clinkering plant must consequently be in contact with hot combustion gases, where large temperature differences between the fluid and the solid matter encourage the occurrence of caking and necessitate a relatively long clinkering time.

The invention has the aim of overcoming this disadvantage by providing, in an installation of this type, a clear separation between the zone where decarbonation takes place and the clinkering zone. Operating in this way, each reaction is carried out at the appropriate temperature, under homogeneous conditions, and the amount of heat which is strictly necessary is introduced into each zone, making it possible to provide economies in the overall fuel consumption, to improve the quality of the clinker obtained and to reduce the risk of caking.

SUMMARY OF THE INVENTION

According to the invention, there is incorporated into each pellet of raw material, in divided form, a certain amount of carbon which is determined in such a way that combustion of it produces, inside each pellet, the amount of heat necessary to carry out decarbonation of the matter, taking into account the heat introduced by the hot gases circulating upwardly, decarbonation being completed at the bottom of the pre-heating zone and the pellets penetrating into the clinkering zone at a temperature which is close to the clinkering temperature, the additional heat produced by injection of fuel into this zone being just sufficient to cause and maintain the clinkering reaction.

According to a further characteristic of the invention, a certain fraction of the gases circulating in the upper portion of the cooling zone is drawn off and the gases which have been removed are injected into the pre-heating zone.

The incorporation of carbon into pellets of raw material has already been envisaged for the manufacture of cement. Such a process is described, for example, in Australian Pat. No. 424,421. However, the pellets thus formed are treated in a conventional tunnel kiln, and the amount of carbon which they contain is required to introduce all the thermal energy necessary for the whole clinkering process. There is a danger, under such conditions, that unequal distribution of temperature will occur in the charge, leading to irregular quality of the product obtained.

In the process according to the invention, on the contrary, the amount of carbon added to the pellets is determined so as to introduce into the pre-heating zone the amount of heat just necessary for the decarbonation reaction. The throughput, the composition and the temperature of the gases circulating are regulated, as well as the flow per unit time of the material as it moves downwards, so as to allow complete combustion of the carbon, which carries out total decarbonation of the material before its entry into the clinkering zone, the temperature of the pellets as they leave the pre-heating zone being less than that at which the likelihood of caking starts. This temperature, which depends on the starting material used, may for example be 1150°. In this way, caking prior to clinkering is avoided and, on the other hand, the actual clinkering of the pellets takes place in the fluidized bed where the burners additionally provide the heat necessary for starting and maintaining the clinkering reaction, the rate of flow of the materials being regulated in such a way that they remain for some ten minutes in this zone at a temperature of the order of 1400° C. The amount of supplementary heat supplied is moreover low, since the reactions are exothermic.

BRIEF DESCRIPTION OF THE DRAWINGS

In order to aid understanding of the invention, an installation for the manufacture of clinker employed for carrying out the process according to the invention will now be described by way of example, with reference to the attached drawings.

DETAILED DESCRIPTION OF AN EMBODIMENT

Figure 1:
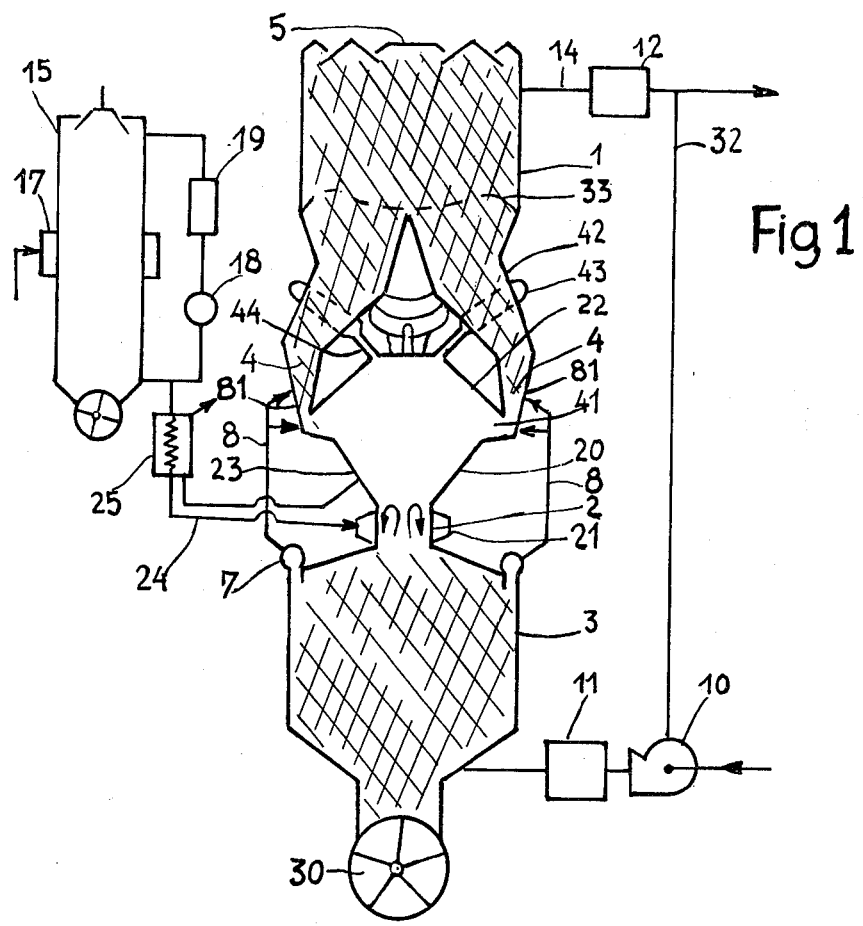
FIG. 1 shows a sectional view taken through the vertical plane of a shaft kiln and its associated equipment intended for the preparation of cement clinker from pellets.

The apparatus shown in FIG. 1 consists of three main superposed parts 1, 2, 3 comprising, respectively, the upper heat-exchanger 1, the clinkering zone 2 and the lower heat-exchanger 3.

The upper heat-exchanger 1 and the lower heat-exchanger 3 constitute two shaft kilns having a vertical axis, of appreciable diameter, which is calculated on the basis of the throughput of pellets which it is intended to treat, while the clinkering zone 2 is made up by a conduit having a smaller diameter.

The upper exchanger 1 is connected to the central clinkering zone by a set of distributing hoppers 4 arranged symmetrically around its axis, these discharging into a central hopper 20 which supplies the clinkering conduit 2 with materials, the latter being arranged to discharge along the axis of the lower heat-exchanger 3.

The upper part of the installation is provided with a feeding device 5 which makes it possible to introduce the pellets in the form of successive regular layers into the top portion of the pre-heating zone. The pellets have already been previously dried, in an associated installation, by the still hot gases leaving the apparatus.

The lower exchanger 3 is provided at its base with a device 30 for extracting the materials at an adjustable rate.

A blower 10 is provided for supplying the base of the lower exchanger with an amount of air which is adjusted by means of a valve 11.

The gases reaching the top of the installation are sent to the chimney via a conduit arrangement 14 and a damper 12.

The air introduced by the blower 10 may have its oxygen content reduced as a result of partially removing, via conduit 32, some of the cold exhaust gases (which essentially consist of carbon dioxide and nitrogen) leaving the upper portion of the apparatus.

This consequently leads to the establishment of an upward circulation of combustive gas in counter-flow to the materials which pass through in the downward direction. Channelling of the gases into the constricted conduit 2 causes fluidization of the materials at this point. Furthermore, an atomized solid fuel, in liquid or gaseous form, is injected through a conduit into burners 21 distributed around the periphery of the conduit 2, where it burns in contact with the combustive gases circulating in the upward direction.

The hot gases collect in the central hopper 20 which is closed by a dome 22. The major portion of these hot gases is injected at 45 into the upper widened portion 42 of the hoppers 4 by means of a manifold arrangement 43 which provides for regular distribution of the gases and which is supplied from the dome 22 by conduits 44 having valves for regulating the throughput of gases.

These hot gases pass upwardly through the upper heat exchanger 1 and provide for pre-heating of the pellets introduced by the feed device 5.

Furthermore, the carbon contained in the pellets burns when in contact with the hot combustive gases for decarbonation of the raw material contained in each pellet.

The pellets which have been pre-heated and decarbonated in this way pass downwardly into the hoppers 4 from whence they are distributed by the orifices 41 into the feed hopper 20 where they become additionally heated before they arrive in the clinkering zone 2 where a fluidized bed is provided, the rate of flow of which is adjusted so that the pellets remain there for the length of time necessary for completion of the clinkering reaction. The pellets then descend into the lower heat exchanger 3 where they become cooled by transfer of their heat to the gases circulating in the reverse sense, before they are extracted at the lower end.

Figure 2:
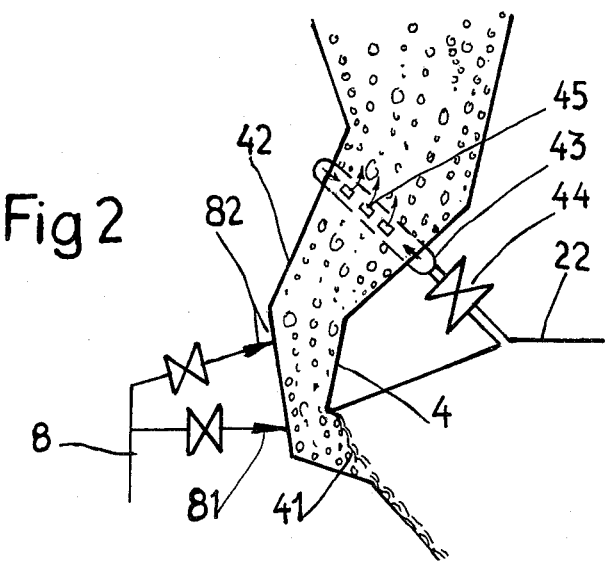
FIG. 2 shows, on an enlarged scale, a partial view of the installation shown in FIG. 1.

An annular conduit 7, arranged above the cooling zone 3 or at a lower level, is provided for removing a portion of the pre-heated gases and for recycling these gases which mainly consist of hot air, this being done using a set of pipes 8 which discharge into the lower portion of the distributing hoppers 4 through injectors 81 provided with flow regulating valves (FIG. 2).

The rate of flow of the materials distributed by each hopper 4 can advantageously be adjusted using this injection of air into the sloping bank of material thus set up. Should there be a breakdown of the booster, the flow of materials is stopped automatically. Additionally, this arrangement obviates the need to sweep the lower portion of the distributing hopper 4 with a high speed fluid which would lead to accumulation of dust in the apparatus. Taken as a whole, the apparatus is designed in such a way that the velocity of the fluid remains substantially constant whatever the temperature may be, except in the clinkering zone.

A second shaft kiln 15 may advantageously be used for the production of semi-coke from coal, lignite or other carbonaceous materials. This kiln, which is of a known type and described, for example, in French Pat. No. 885,257 of the Company ERIM, is supplied with air by a device 17 at its central portion and produces combustible gases which are removed from its top portion. After washing and removal of tars by a device 19, a booster 18 is provided for, firstly, recycling a portion of these gases to the bottom of the ERIM kiln 15 and, secondly, for feeding the burners 21 of the clinkering zone 2 of the cement making kiln.

The semi-coke produced by the ERIM kiln 15 is incorporated into the pellets of raw material with which the clinker producing kiln is supplied.

In order to carry out the process, the first step consists of mixing the materials necessary for the manufacture of the clinker, in the second proportion, and adding the carbon, in the form of finely divided particles, to these materials, which makes it possible to provide an intimate mixture of the raw materials and the carbon.

By way of example, pellets are prepared containing 78% carbonate and 22% clay, to which approximately, 50 Kg of semi-coke produced by the ERIM kiln is added per ton of raw material, the semi-coke having been ground to suitable dimensions.

Pelleting of this material is then carried out in order to obtain pellets having a size of the order of 15 to 25 mm, for example, these pellets then becoming hardened by the preheating so as to have sufficient mechanical strength at the time of clinkering by fluidization.

Each of the pellets consequently contains the desired amount of carbonate, clay, and, optionally, adjuvents for their subsequent transformation into clinker at high temperature. Moreover, the amount of carbon in the form of semi-coke contained in each one of the pellets is determined in such a way that the heat released by the combustion of this carbon is adequate, under the conditions to which the pellet is subjected in the shaft kiln, to provide for decarbonation of the raw mixture and to bring the pellet to the highest possible temperature consistent with preventing caking of the pellets among themselves, this being, for example, 1100° C.

Within the first part of the pre-heater 1 and up to point where the pellets reach a temperature of the order of 600°, additional drying of the pellets occurs, the main part of the drying having already been completed outside the kiln, and certain transformations of the materials such as distillation of the occluded gases, modification of texture due to the binders used etc., take place.

It is preferable to arrange for the major part of the drying of the pellets to take place outside the kiln, the gases then leaving through the conduit 14 at a temperature of about 250° C. These gases, which are, in practice, almost exclusively made up by carbon dioxide and nitrogen (30% $CO_2$, 70% $N_2$) providing for prior drying of the pellets, after which they are sent to the chimney.

On the other hand, if one were to hold the kiln with damp pellets, the gases leaving the kiln could cool to a temperature lower than their dew point, which could have a disturbing effect on the safe keeping of the pellets, as a result of condensation of water.

The combustive gas is made up by an oxidizing fluid at a high temperature, of the order of 1200°, recovered by the annular conduit 7 and introduced by adjustable injectors 81 into the base of the distributing hoppers 4, this fluid becoming mixed, at the upper portion of the hoppers 4, with the gases leaving the clinkering zone 2 at 1400° and being introduced by the injectors 43.

This hot fluid, which flows upwardly in the opposite direction to the flow of pellets, causes the combustion of the carbon, and, depending on the nature of the carbon used, this combustion starts in the pre-heater 1 at about 500° C. upwardly.

Starting at 600° C., the endothermic decarbonation reaction starts, as well as a certain number of reactions having an exothermic nature due to crystalline recombinations.

The amount of carbon incorporated is, as has been stated above, determined as a function of the composition of the materials, the quality of the carbon, the temperatures and the expected compositions of the gases circulating in the kiln, in order that its combustion introduces the amount of heat into each pellet which is necessary for its decarbonation, taking into account the amount of heat supplied by the gases.

Adjustment with respect to each other of the material throughput and the flow rate of the gases leaving the clinkering zone 2 and leaving the cooler 1 is carried out in order that the carbon is completely burnt and that decarbonation is completed at the base of the pre-heater 1, if possible before entry into the hoppers 4, the temperature of the pellets not exceeding approximately 1100° at this point.

In FIG. 1, one example of a 1100° isotherm within the preheater has been indicated by reference numeral 33.

Combustion of the carbon could nevertheless continue during the descent of the materials inside the hoppers 4, but the amount of oxygen in the fluid with respect to the amount of carbon in the pellets is stoichiometric and the rate of advancement of the pellets is such that in any case the totality of the carbon is burnt before the pellets reach the clinkering zone.

Thus, according to the invention, as a portion of the heat is supplied by the hot gases, the complementary amount which is just necessary for decarbonation is supplied by the carbon incorporated in the pellets, and the decarbonation zone is strictly limited to the upper exchanger.

During their downward progression through the distributing hoppers, the pellets continue to be heated through contact with the hot fluid, so as to reach a temperature in the region of 1200° when they enter the clinkering zone 2.

Injection at 81, into the base of the distributing hoppers 4, of fluid reheated in the cooler 3 at a temperature of the order of 1200°, makes it possible to regulate aerodynamically the flow rate of the materials discharged into the clinkering zone 2. Optionally, a further injection at 82 of the same recycled fluid provides for a certain degree of adjustment of the temperature of the gases ascending in the hoppers 4 and the pre-heater 1. Should the need arise, one could furthermore mix a certain amount of cold air with the gases coming from the cooler 3, or even draw off a portion of the cooler gases at a lower level in the cooler 3.

The injection of the air is carried out in such a way that only a very small portion of the air passes through the materials descending in the distributing hopper 4. The result is that, as the velocity of the air is small, there is no transfer to and accumulation of dust in the flow of materials.

Should there be a fault in the air booster, the flow of materials stops automatically and it is unnecessary to provide a shut-down valve.

The arrival of solid material in the clinkering zone, and the arrival of combustive fluid at a high temperature through the base of the clinkering zone and originating from the upper portion of the cooler, lead to the formation of a fluidized bed into the middle of which the flame and the combustion gases from the burners 21 penetrate, which makes it possible to bring the pellets to their clinkering temperature, which is in the region of 1450°.

The pellets enter the clinkering zone at a temperature which is close to the clinkering temperature, and as the clinkering reactions are to a large extent exothermic, only a small additional supply of thermal energy is needed in the clinkering zone in order to bring about and maintain the clinkering reaction.

As has been seen above, it is possible to use, for supplying the burners, combustible gas produced by the ERIM furnace, this gas of 2000 cal/m$^3$ being obtained at extremely low cost.

As is always the case in this type of installation, it is necessary to provide a purge in the gas circuit in order to control the volatile alkali content. This purge, which is indicated by reference numeral 23, above the clinkering zone 2, has the purpose of pre-heating the combustible gas originating from the ERIM furnace and supplied by conduit 24 to the burners 21 of the clinkering zone 2, in an exchanger 25 where the alkalis are condensed.

The consumption of the burners in the clinkering zone represents about 20% of the total thermal energy consumption of the complete apparatus, per tonne of clinker.

It is also possible to inject into the clinkering, a small amount of coal tar which is recovered at 19 from the ERIM furnace, in order to avoid the carrying away of fine particles which have become detached from the pellets, within the clinkering zone and towards the upper part of the shaft kiln, by the gases circulating in the kiln.

The hot gases leaving the clinkering zone at 1400° C. and consisting of a highly oxidizing fluid, for example air comprising a small proportion of $CO_2$, originating from the combustion taking place at the burners 21, encounter the gases leaving the adjustable injector 81 of the distributing hoppers and which bypassing the clinkering zone, and additionally those which are optionally re-introduced at 82.

These gases are introduced into the upper portion of the distributing hoppers 4 and provide for pre-heating up to a temperature which is close to the clinkering temperature. As total combustion of the carbon has occured before the pellets enter the clinkering zone, the time which the pellets spend in the clinkering zone may be relatively short and, consequently, it is possible to adjust the throughput of solid matter to have a relatively high value, in other words making it possible to provide the installation with a high level of productivity. In order to vary the throughput of solid materials, all that is needed is to modify the rate of extraction and the rate of feed of the kiln.

The time spent by the material in the clinkering zone is kept under control so as to ensure homogeneity of the products. This period of time is a function of the dimensions of the pellets and is about ten minutes for the envisaged products.

Upon leaving the clinkering zone, the particles of clinker fall into the cooler where they constitute a movable bed which moves as a function of the rate of extraction from the base of the cooler.

The cold air delivered by the blower 10 to the base of the cooler which is made up by a vessel in which heat-exchange occurs by counterflow, meets layers of clinker particles which become progressively hotter, and absorbs the heat from these particles of clinker and becomes heated to a temperature in the region of 1200° at the top of the cooler, the counter flow heat exchanger being balanced.

Inversely, the particles of clinker become cooled and reach the extraction zone at a low temperature, for example 100°.

The fluid circulating in counter-flow through the solid matter provides for combustion of the gas supplied into the clinkering zone, then for the combustion of the carbon in the pre-heating and decarbonating portion of the installation.

Moreover, the parallel use of the low capacity ERIM furnace 15 in conjunction with the clinkering kiln makes it possible to use low cost soft coals for producing, firstly, the carbon incorporated in the pellets of raw material and, secondly, the additional fuel supply providing for initiation and maintenance of the clinkering reaction.

Production of one ton of clinker requires the introduction of 1.6 t of pellets into the shaft kiln, the pellets containing in the region of 50 kg of carbon per ton of pellets. It is necessary to introduce into the base of the cooler 800 m$^3$ of cold fluid per ton of clinker produced, the cold fluid consisting of air to which a small amount of waste gas from the kiln is added.

Depending on the nature of the materials, it is possible to withdraw 200 m$^3$ per ton of fluid at 1200° at the upper portion of the cooler, 650 m$^3$ of hot fluid being left to penetrate into the clinkering zone. The 55 kg of carbon is produced in the form of semi-coke, starting from 80 kg of dry soft coal in the ERIM furnace, 60 m³ of gas of 2000 calories per m³ calorific value being further produced by the ERIM furnace.

The overall thermal balance sheet for the operation shows a consumption of 610 calories per kg of clinker of the quality obtained at present by the dry method. The economy obtained is consequently of the order of 25%.

Moreover, as the major portion of the thermal energy is supplied by dry soft coal or similar products (lignites), the economy of price per therm is of the order of 21% when compared to fuel oil. Seen in this light, the economy obtained in the cost of fuel is of the order of 40% when compared to the best dry process in present day use.

Trials carried out by the applicant have moreover shown that a profitable industrial installation could have relatively small dimensions, since the total height of this installation may be optionally limited to 8 m.

In actual practice, the pre-heater should have a height of 3-4 m, the clinkering zone a height of 1 m and the cooler a height of 2-3 m. Taking into account the associated installations, the device is consequently relatively compact.

In order to obtain plant having a very high production rate, all that is needed is to increase the cross section of the installation, in particularly that of the upper heat exchanger, i.e., the pre-heater, and that of the lower heat exchanger, i.e., the cooler.

In this way it is possible to show that a cement manufacturing plant having a production of one million tons of clinker per year would have a diameter in the region of 10 m very like that of large blast furnaces being built at present. Nevertheless, it is preferable to limit oneself to diameters of 5 m and to arrange several installations in parallel to facilitate continuity of production. For such installations, the investment which must be carried out is less than the investment needed in the case of a conventional cement manufacturing plant. The compactness of the installation also has the advantage of reducing thermal losses through the wall of the kiln.

Furthermore, as there is excellent heat exchange at both the upper exchanger and the lower exchanger, the gases and the solid materials leave the kiln at a low temperature, which is another factor assisting in improving the thermal yield.

Finally, regulation of the process is fairly simple, since a number of parameters are available which make it possible to, firstly, have control of the temperature distribution in the pre-heater and, secondly, to regulate the supply to the clinkering zone and to assure that the product spends the correct amount of time in the vessel of the clinkering zone in order to obtain clinker of homogeneous composition.

By varying the size of the pellets, it is possible, for example, to adjust the combustion time of the carbon. It has however been shown that, in order to optimize the productivity of the exchangers and the amount of time spent in the clinkering zone, the ideal size of the pellet should lie with the range of between 15 and 30 mm, bearing in mind that this parameter largely depends on factors associated with the starting materials used (quality of the raw material and the reactivity of the carbon, for example). The size of the pellets may be chosen so as to be outside this range under certain conditions, but it has been shown that it was not possible to use, under correct conditions, pellets having a size less than 6 mm.

It is in fact necessary that the pellets be made of the most appropriate size in order to reduce the loss of charge from the pre-heater and the cooler and at the same time to permit suitable operation of the fluidizer and the distributor. A compromise should thus be sought concerning the size of the pellets.

As it is desirable to assure that all the carbon is burnt and to balance the zone where the products are pre-heated by supply of thermal energy from the hot fluid and the combustion of the carbon, for one given raw material, a characteristic value is provided for the amount of carbon to be included in the raw pellets. Combustion of this carbon can be regulated depending on the location where injection of the hot oxidising fluid is carried out, it either being completely obtained from the clinkering zone, or being partly taken from the outlet from the zone 3 for pre-heating the gases while bypassing the clinkering zone 2.

Different devices concerning the fluid circuits are consequently possible as a function of the nature of the raw material, the size of the pellets, the degree to which the latter are compacted, etc. These devices may be one of the following:

(1) an arrangement in which oxdizing fluid bypasses the clinkering zone, enabling re-injection of the hot fluid at a predetermined point into the pre-heater, (2) an arrangement in which the cooler for the clinker is swept by the oxidizing fluid, this oxidizing fluid being either air or a mixture of air and of flue gases taken from the waste gas discharge and added in order to decrease the oxygen content of the fluid; or (3) an arrangement in which partial injection of air and/or flue gases takes place at the distributors so as to provide the necessary automatic regulation of the feed to the clinkering zone.

A further factor which can be varied in order to control the temperature distribution within the pre-heater is the degree of division of the carbon within the paste used to manufacture the pellets. It is also possible to vary the degree of compactness of the pellets in order to at least partly correct the combustion time of the carbon.

Automation of the process may be provided by using a device for regulating the feed to the clinkering zone while at the same time maintaining the pressure drop within it constant and assuring that the product spends the correct amount of time in the high temperature portion which operates under fluidization conditions.

It will thus be seen that the main advantages of the process and the device according to the invention comprise separating the decarbonation and the clinkering zones while introducing the adequate amount of heat into each of these; providing substantial economies in fuel consumption; obtaining a high rate of productivity using installations the cost of which is lower than that of conventional installations; and of providing easy regulation the process, the full automation of which can be envisaged.

When compared to previous processes, using pellets of raw material not containing carbon, the process according to the invention has the advantage of producing decarbonation and pre-heating of the materials actually within each pellet by burning of the carbon contained in the pellets. The decarbonation zone is in fact the most suitable place to provide the greater portion of the heat energy supplied, so that the endothermic reactions occuring during decarbonation are compensated for by the exothermic reactions occuring during combustion of the carbon to $CO_2$.

When compared to processes using heat exchange between hot gases and pulverulent materials, the present process provides the advantage of the heat exchange operation taking place under counter-flow conditions, while pulverulent materials can only be treated using heat exchange under parallel flow conditions corrected by the effect of successive cyclones. Moreover, caking on the wall occurs when using pulverulent materials after a certain temperature threshold is reached.

The invention makes it possible to pre-heat the pellets to a high temperature for feeding them to the clinkering zone, with the effect of decreasing the amount of fuel consumed in the clinkering zone.

It would be possible, without departing from the scope of the invention, for the shape of the shaft kiln used for carrying out the process to be very different from the form described and illustrated in the instance above. For example, in place of a single clinkering zone one could also use several clinkering zones each fed by one or more hoppers.

The distribution device preceding the clinkering zone which allows the latter to operate under partial fluidization conditions could also be very different from the system described. A mechanical distributor could be used, but air flow regulation does allow greater flexibility. Cold fluids can be incorporated in the gases flowing in the shaft kiln at other locations in order to modify the composition and reactivity of the gases.

The device may be used independently of a shaft furnace such as an ERIM furnace, for the production of carbon and combustible gas, the association of the latter however making it possible to obtain considerable economies in fuel costs.

I claim:

1. Process for manufacturing cement clinker by firing raw material previously prepared in the form of pellets in an apparatus comprising, from top to bottom, a zone for drying, preheating and pre-calcination, a clinkering zone, and a cooling zone through which said pellets pass successively in a downward direction, in countercurrent to a combustive fluid introduced into the bottom of said cooling zone and passing upwardly, carrying with it the gases formed in said apparatus, said pre-heating and cooling zones each operating as a tunnel kiln, said clinkering zone comprising a restricted conduit having a vertical axis and connected upwardly with said pre-heating zone by at least one pellet distribution hopper, said restricted conduit opening at the bottom into the upper part of said cooling zone and channeling said combustive fluid flowing in an upward direction so that said pellets form a fluidized bed into which a fuel is injected, said process comprising the steps of
   (a) supplying said apparatus with pellets having a size in excess of 6 mm and comprising a quantity of carbon so determined that its combustion produces within each pellet just the amount of heat required to effect decarbonation of said raw material, taking account of the amount of heat introduced by the gases flowing in said pre-heating zone, the latter comprising at least a portion of the gases leaving said clinkering zone, and being introduced at an adjustable rate through said at least one hopper below said pre-heating zone;
   (b) adjusting the flow of said gases and of said raw materials as a function of one another during the operation, so that decarbonation due to combustion of the carbon is achieved at the base of said pre-heating zone, and said pellets are then heated by contact with hot gases while passing downwardly through said at least one hopper, whereby they reach a temperature close to the clinkering temperature as they enter said clinkering zone; and
   (c) introducing into said clinkering zone an amount of fuel sufficient to bring about and maintain the clinkering reaction.

2. Process according to claim 1, including the step of adjusting the flow of gas and of raw material, as well as the amounts of fuels supplied in order to control the temperature balances in each of said pre-heating, pre-calcination, clinkering and cooling zones.

3. Process according to claim 1, wherein an adjustable flow of gas which has flowed through and risen to the upper portion of said pre-heating zone is introduced at the base of said at least one hopper, said gas by-passing said clinkering zone and mixing with the gases leaving said zone.

4. Process according to claim 2, wherein introduction of the gas moving from said cooling zone to said base of said at least one hopper facilitates aerodynamic adjustment of the materials discharged into said clinkering zone.

5. Process according to claim 1, wherein said pellets have a size in the range of 10 to 30 mm.

6. Process according to claim 5, wherein said pellets have a size in excess of 15 mm.

7. Process according to claim 1, wherein the carbon incorporated in said pellets comprises particles of semi-coke obtained by cokefaction of charcoal in a kiln.

8. Process according to claim 5, wherein additional heat is supplied to said clinkering zone, said additional heat being obtained at least partly from combustion of gas resulting from said cokefaction.

9. Process according to any one of claims 1, 2 and 4, wherein a constant pressure loss is created in said clinkering zone operating under fluidization conditions, when considering the direction of travel of the gases, and wherein the flow of solid materials in the clinkering zone is adjusted by varying the rate of extraction and the feed rate of said solid materials.

10. Process according to claim 1, wherein the temperature and the oxygen content of said combustive fluid is regulated by introduction into the flow circuit of a certain amount of cold flue gases taken from the upper outlet of the apparatus.

11. Process according to claim 1, wherein tars are introduced into the reactor at the level of said clinkering zone in order to prevent fine grain particles from being carried along by the gases flowing within the reactor.

12. Apparatus for manufacturing cement clinker by firing raw material previously prepared in the form of pellets, comprising three superposed parts including an upper heat exchanger in the shape of a tank constituting a pre-heating zone connected by at least one distribution hopper to a restricted conduit formering a clinkering zone and opening upon the upper portion of a lower heat exchanger in the shape of a tank, forming a cooling zone, said restricted conduit being supplied by a central hopper into which terminate the lower end of each at least one distribution hopper, and which defines a closed space in which collect the hot gases issuing from said conduit and which is connected by a conduit provided with a supply regulating valve to a means for regular distribution of the gases in the upper portion of each at least one distribution hopper.

13. Apparatus according to claim 12, comprising means for controlling the temperatures of said raw material and of said gases in each of said zones.

14. Apparatus according to claim 13, wherein each said distribution hopper is provided at its outlet end with means for regulating the supply of material discharged into said central hopper.

15. Apparatus according to claim 14, wherein said means for regulating the supply of said material comprises injectors issuing at the base of each distribution hopper in the ramp of material formed at the outlet end and connected by a conduit provided with means for regulating the supply, to a collector provided at the upper part of said cooling zone for the setting apart of a portion of the heated gases in said zone.

* * * * *